(12) United States Patent
Bergholts et al.

(10) Patent No.: US 6,866,907 B1
(45) Date of Patent: Mar. 15, 2005

(54) PACKAGING MATERIAL AND PACKAGES PRODUCED FROM THE MATERIAL FOR LIGHT-SENSITIVE PRODUCTS

(75) Inventors: Lars Bergholts, Höganäs (SE); Lotta Klint, Löddeköpinge (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 09/700,840

(22) PCT Filed: May 18, 1999

(86) PCT No.: PCT/SE99/00843

§ 371 (c)(1),
(2), (4) Date: Jan. 8, 2001

(87) PCT Pub. No.: WO99/61245

PCT Pub. Date: Dec. 2, 1999

(30) Foreign Application Priority Data

May 22, 1998 (SE) .............................. 9801809

(51) Int. Cl.⁷ ............................ B65D 1/00; B32B 27/00
(52) U.S. Cl. .................. 428/35.7; 428/34.1; 428/34.4; 428/34.6; 428/34.7; 428/34.8; 428/35.2; 428/35.4; 428/411.1; 428/446; 428/448; 428/451; 428/454; 428/500
(58) Field of Search ............................ 428/34.8, 35.2, 428/35.7, 34.1, 34.4, 34.6, 34.7, 35.4, 411.1, 446, 448, 451, 454, 500

(56) References Cited

U.S. PATENT DOCUMENTS

| | | | |
|---|---|---|---|
| 3,861,994 A | 1/1975 | Stark | |
| 4,256,791 A | 3/1981 | Holmström et al. | |
| 4,424,260 A | 1/1984 | Pupp | |
| 4,590,126 A | 5/1986 | Andersson | |
| 4,994,310 A | 2/1991 | Frisk et al. | |
| 5,122,410 A | 6/1992 | Löfgren et al. | |
| 5,133,999 A | 7/1992 | Löfgren et al. | |
| 5,143,764 A | * 9/1992 | Rosen | 428/36.5 |
| 5,492,741 A | * 2/1996 | Akao et al. | 428/35.2 |
| 5,508,075 A | 4/1996 | Roulin et al. | |
| 5,520,970 A | 5/1996 | Christensson et al. | |
| 5,658,622 A | 8/1997 | Berlin et al. | |
| 5,721,027 A | 2/1998 | Frisk et al. | |

FOREIGN PATENT DOCUMENTS

WO   WO 97/13637   * 4/1997   ........... B29D/22/00

OTHER PUBLICATIONS

Richard J. Lewis, Hawley's Condensed Chemical Dictionary, 2001, John Wiley & Sons, fourteenth edition, p. 208 and 753.*

* cited by examiner

Primary Examiner—Harold Pyon
Assistant Examiner—Walter Aughenbaugh
(74) Attorney, Agent, or Firm—Burns, Doane, Swecker & Mathis, L.L.P.

(57) ABSTRACT

The present invention provides a packaging material of single multi-layer type including at least one layer of plastic having improved light barrier properties, and which layer of plastic includes particles of carbon black and wherein the plastic layer containing the carbon black further includes mineral particles substantially uniformly distributed within the plastic material of that layer in a quantity between about 3% and 80% of the total weight of the layer. The packaging materials have superior light barrier properties over similar materials in the art, and can be used to enhance the packaging and storage of light-sensitive food products.

15 Claims, 1 Drawing Sheet

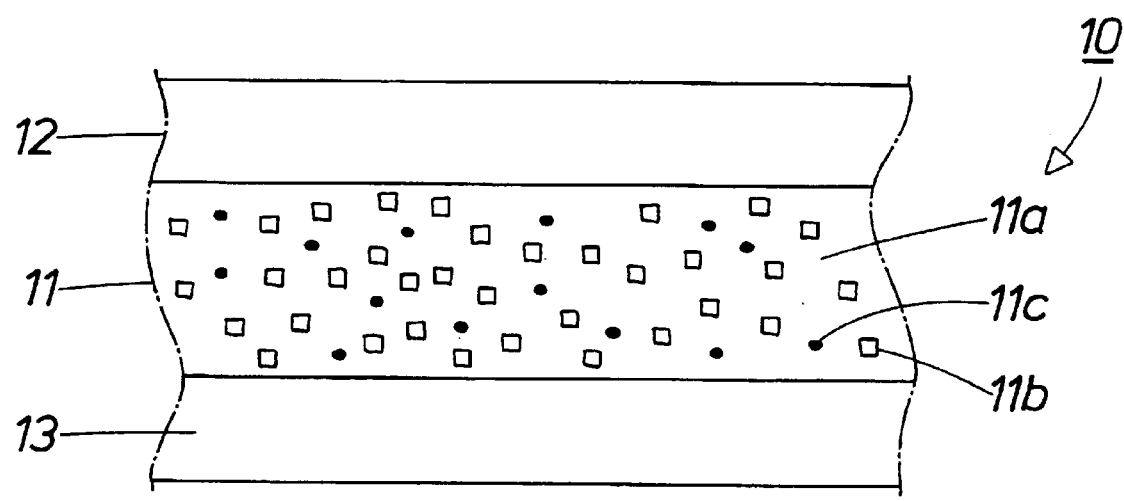

PACKAGING MATERIAL AND PACKAGES PRODUCED FROM THE MATERIAL FOR LIGHT-SENSITIVE PRODUCTS

TECHNICAL FIELD

The present invention relates to a packaging material including layers of plastic permanently united with one another and of which at leastlone layer includes, for the purpose of elevating light-barrier properties, distributed particles of carbon black. The present invention also relates to a package produced from the packaging material for light-sensitive products.

BACKGROUND ART

Both packaging material and packages of the type described above are known in the art. For example, there occur on the market bottles which are produced by a combined extrusion/blow moulding operation of such triple-layer material. The material in these bottles has an interjacent or intermediate layer of High Density Polyethylene (HDPE) with admixed particles of carbon black and outer layers of HDPE on both sides of the interjacent layer.

The prior art bottles are employed, inter alia for transporting so-called UHT milk, i.e. milk which, for the purpose of extending its shelf life, has been subjected to a heat treatment at approximately 135–150° C. during approximately 1–2 seconds for reducing or eliminating the number of harmful micro-organisms occurring in the milk.

Since milk is a very light-sensitive product which do not stand lengthy exposure to light, in particular within the ultra violet wavelength range without being damaged, it is important that the milk is stored in its package in such a manner that it is not unnecessarily exposed to ultra violet radiation from its ambient surroundings.

Plastic layers consisting exclusively of HDPE are almost totally devoid of barrier properties against light, in particular ultra violet light, and consequently do not alone afford the light protection which is necessary in order for the milk to be able to be stored with the desired extended shelf life. In order to make the long-term storage of milk possible in the prior art bottles, particles of a light-absorbing material, normally carbon black, are therefore incorporated in the inteiacent layer of the packaging material, such particles efficiently absorbing, and thereby preventing impinging light from the outer ambient surroundings of the bottle from penetrating through the wall material of the bottle and reaching the packed milk.

However, particles of carbon black in the large quantities that are employed in the prior art packaging material make the interjacent layer extremely blackened, which could readily be seen through the outer HDPE layers of the bottle and give the bottle an unappealing black appearance if the interjacent layer were not concealed. In order to conceal the thus blackened interjacent layer, the outer HDPE layers of the bottle are therefore provided with a white colouring pigment of titanium dioxide, $TiO_2$, in a sufficient quantity to conceal the black interjacent layer beneath and thereby impart to the bottle a more consumer-attractive white appearance.

However, the problem inherent in the prior art triple-layer material is that, as was mentioned above, it requires relatively large quantities of: the blackening particles of carbon black in the interjacent layer in order to attain the requisite light barrier properties, at the same time as it also requires correspondingly large quantities of white pigment ($TiO_2$) in the outer layer for concealing the undesirable blackening caused by the particles. This entails unnecessary, but unavoidable, increased material consumption and thereby increased material costs for producing the material.

Another drawback which is related to the unnecessarily large quantity of carbon black particles is that the waste material which occurs in the bottle producing process cannot directly be recycled into the process because of the extreme blackening, but must first be whitened by the addition of white pigment ($TiO_2$) or other white colouring matter in order to be able to be recycled and reused in the process. Such a handling involves extra material consumption and increased material costs, which often renders recycling and reuse unprofitable.

OBJECT OF THE INVENTION

The task forming the basis of the present invention is therefore to provide a packaging material of the type described by way of introduction which neither requires large quantities of carbon black to achieve superior light barrier properties nor large quantities of white pigment ($TiO_2$) or other white colouring matter in order to impart to the packaging material a white appearance.

SOLUTION

This task is solved according to the present invention by means of a packaging material possessing the characterizing feature as set forth in appended claim 1. Improvements and expedient embodiments of the present invention have further been given the characterizing features as set forth in the appended subclaims.

SUMMARY OF THE INVENTION

The present invention is the result of the surprising discovery that a film or a thin panel of mineral-filled plastic obtains a synergistically increased light barrier if light-absorbing particles of carbon black are added to it. By experiments, it has namely been possible to confirm that the inherent light barrier properties of the mineral-filled plastic film, which per se are insufficient to prevent undesired transmission of ultra violet rays, are considerably improved by an addition of but a very slight quantity of carbon black, which in turn entails only a slight blackening in comparison with the prior art technology. Visually, this may be expressed such that the interjacent layer in the packaging material according to the present invention will only be coloured grey, while the interjacent layer in the prior art packaging material is totally black.

The mechanism behind the synergistic light barrier effect which is surprisingly attained using the present invention has not been totally clarified, but could possibly be explained by the fact that the light-reflecting mineral particles extend the ray paths of the impinging light in the interjacent layer because of reflection against the particles, and that the probability that the light would collide with and be absorbed by the light-absorbing particles thereby increases. However, this explanation should not be seen as the only conceivable one, but is rather to be considered as a working hypothesis for describing the present invention.

The material in the mineral-filled interjacent layer comprises a plastic compound and particles embedded in the compound consisting, on the one hand, of a light-reflecting material and, on the other hand, a light-absorbing material.

The actual basic compound may consist of any suitable plastic whatever, such as polyolefin, polyester, polyamide etc., but is preferably a polyolefin plastic which is already employed in commercial packages of bottle type.

Examples of such polyolefin plastics are polyethylene, such as high density polyethylene (HDPE), and polypropylene (PP) of both homo- and copolymer type, such as a copolymer of ethylene and propylene with a melt index between 0.5 and 5 according to American Society for Testing and Materials (ASTM) (2.16 kg; 230° C.) which is an already well-known and well-established copolymer in packaging contexts.

As the light-reflecting mineral filling in the interjacent layer, use may be made of any suitable particles whatever of montmorillonite, dolmite, calciumcarbonate, chalk, talcum, mica, clay etc., but use is preferably made of particles of dolomite, which is both readily available and moreover approved for use in packages for foods.

One example of a mineral-filled plastic compound for the interjacent layer in the packaging material according to the present invention is that which is described in, for example, EP 0 353 991, EP 0 353 498, EP 0 494 594, EP 0 494 0595, EP 0 512 364, EP (94105439.7), EP (95926568.7) or EP (96935679.9). According to these specifications, the mineral-filled plastic compound preferably includes a copolymer of ethylene and propylene with a melt index between 0.5 and 5 according to ASTM (2.16 kg; 230° C.) and particles of chalk admixed in the plastic compound in a quantity of between 50 and 80% of the total weight of the mineral-filled compound.

As light-absorbing material in the interjacent layer in the packaging material according to the present invention, use is made, as has already been mentioned, of particles of carbon black which, already in very small quantities, gives a synergistic effect in combination with the above-described mineral-filled plastic compound. In order to attain the desired light barrier, as small quantities as 0.04–1% of the total weight of the interjacent layer are sufficient, which effectively prevents the transmission of light, in particular ultra violet light, at the same time as the particles discolour (blacken) the interjacent layer to only an insignificant degree.

In one preferred embodiment of the packaging material according to the present invention, the interjacent layer thus consists of a polyolefine plastic compound containing between 3 and 80% filler particles, such as montmorillonite, dolomite, $CaCo_3$, talcum, mica, clay etc. and between 0.04 and 1% light-absorbing particles of carbon black.

The outer plastic layer(s) in the packaging material according to the present invention can, but need not, consist of the same plastic compound as that of the interjacent layer. However, use is preferably made of the same plastic compound in all layers included in the material, since such a homogeneous material enjoys major advantages compared with a corresponding heterogeneous material in which different plastic compounds are employed.

A homogeneous material with the same plastic compound in all layers of the material can readily be produced by a conventional extrusion process using existing process equipment and requires no binders (adhesives) or other agents for permanently uniting the co-extruded material layers to one another.

BRIEF DESCRIPTION OF THE ACCOMPANYING DRAWING

The present invention will now be described in greater detail hereinbelow, with reference to the accompanying Drawing in which:

The FIGURE shows a schematic cross section of a particularly preferred packaging material for a package of bottle type according to the present invention.

DESCRIPTION OF PREFERRED EMBODIMENT

The packaging material carrying the generic reference numeral 10 in the FIGURE is of a triple layer structure consisting of an interjacent layer 11 and outer layers 12 and 13 on both sides of the interjacent layer 11.

The interjacent layer 11 consists of a plastic compound 11a and, substantially uniformly distributed in the compound, mineral filler particles 11b (unfilled squares in the FIGURE) and particles 11c of carbon black (black points in the FIGURE) which are preferably randomly distributed in the compound 11a between the mineral particles 11b.

The compound 11a in the interjacent layer 11 may, as has been mentioned previously, consist of basically any type whatever of plastic occurring in packaging contexts, but is preferably a plastic of the polyolefin type.

The mineral particles 11b in the interjacent layer 11 may also be any suitable type of particle whatever, e.g. montmorillonite, dolmite, calcium carbonate, talcum, mica, volastonite, clay etc., but in the illustrated example consist of dolomite which already occurs in known packaging materials together with a polyolefine plastic as described in the immediately preceding paragraph.

The quantity mineral particles may vary within a very broad range from approx 3 and up to approx. 80% of the total weight of the compound. Preferably, the quantity of chalk in the interjacent layer 11 amounts to approx. 65% of the total weight of the compound. This preferred quantity imparts to the interjacent layer 11 good rigidity and thereby makes for the production of configurationally stable, easily handled bottles from the packaging material 10 according to the present invention.

As was mentioned previously, an interjacent layer of plastic compound and mineral particles distributed in the compound per se possesses a certain light barrier property which, granted, is insufficient to wholly prevent the transmission of light, in particular ultra violet light, but which is utilised most advantageously according to the present invention in order to attain the desired total barrier principally against the ultra violet light.

For the above-mentioned purpose, the interjacent layer 11 thus includes light-absorbing particles 11c of carbon black which, together with the simultaneously present mineral particles 11b, has a synergystically elevating light barrier effect and which, even in very small quantities realises an efficient barrier for totally preventing the transmission of ultra violet light through the interjacent layer 11.

The quantity of carbon black in the interjacent layer 11 lies generally within the range of 0.04–1% of the total weight of the interjacent layer, which is sufficiently large to attain the above-mentioned synergy effect, but at the same time sufficiently small so as not to overly blacken the interjacent layer.

The two outer layers 12, 13 on both sides of the interjacent layer 11 comprise, like the interjacent layer 11, a compound of plastic which in principle may be any plastic whatever occurring in packaging contexts. Furthermore, the outer layers 12 and 13 may have mutually different compounds, but preferably have compounds of the same plastic which, more preferably still, is the same plastic as the plastic in the interjacent layer 11. In the illustrated embodiment, the two outer layers 12, 13 thus each comprise a compound of a polyolefine plastic, such as a high density polyethylene and copolymer of ethylene and propylene with a melt index between 0.5 and 5 according to ASTM (2.16 kg; 230° C.).

Since the light-absorbing carbon black particles 11c in the interjacent layer 11 give the interjacent layer a certain grey tone which may be visible through the two outer layers 12 and 13, it may be appropriate (and in certain cases desirable) to conceal the interjacent layer 11 as far as is possible. To this end, white pigment is therefore suitably incorporated in at least that layer which is to form the outside of a package or bottle produced from the packaging material 10. Preferably, white pigment is incorporated in the interjacent layer as well. An advantageous white pigment is titanium dioxide ($TiO_2$).

Since the quantity of carbon black in the interjacent layer 11 is very small and the interjacent layer 11 will, as a result, be only slightly blackened, it will therefore be sufficient to employ very slight quantities of white pigment ($TiO_2$) in the one or both outer layers 12, 13 in order to conceal the interjacent layer 11. Suitable quantities of white pigment may vary up to approx. 5% of the total weight of the outer layer and of the interjacent layer, respectively, depending upon the pertinent quantity of carbon black in the interjacent layer 11.

A bottle produced from the above-described packaging material 10 may be produced by a combined extrusion and blow moulding operation. This production technique is well-known to a person skilled in the art and is described, for example, in published Swedish Patent Application No. 95035374 which, in relevant parts, is hereby included as a reference. For further details concerning this production technique, reference is therefore made to the above Swedish Patent Application.

Bottles produced from the packaging material 10 according to the present invention using the above-described method, by combined extrusion and blow moulding, may advantageously be employed for light-sensitive products in general, but have proved to be particularly advantageous in connection with so-called UHT milk, which may be stored for lengthy periods of up to several weeks in the bottles without being damaged as a result of the effects of light. Moreover, the bottles are light in weight and easy to handle, at the same time as displaying a consumer-attractive white appearance, despite the presence of carbon black in the packaging material.

It will thus have been apparent from the foregoing description that the present invention, with but very simple means, attains its object, at the same time as making possible the production of a packaging material land packages, respectively, with lower material consumption and therefore lower material costs than those involved in the prior art technology.

While the packaging material and packages of bottle type produced from the packaging material have been described with particular reference to the illustrated embodiment shown in the drawing, the present invention is, however, not restricted exclusively to this embodiment it will be obvious to a person skilled in the art that a number of different alterations iland modifications of individual details are possible and self-evident without, to that end, departing from the inventive concept as this is defined in the appended claims.

What is claimed is:

1. A packaging material consisting of three plastic layers, two outer layers and one intermediate layer;
    a. the intermediate layer comprising about 0.04 to about 1 weight % carbon black, and about 3 to about 80 weight % light-reflecting mineral particles;
    b. the plastic of the two outer layers being the same as the plastic of the intermediate layer; and
wherein the packaging material prevents the transmission of ultra-violet light.

2. The packaging material of claim 1, wherein the plastic is a polyolefin.

3. The packaging material of claim 1, wherein the plastic is a high density polyethylene or a copolymer of ethylene and propylene with a melt index between 0.5 and 5 according to American Society for Testing and Materials (2.16 kg; 230° C.).

4. The packaging material of claim wherein the light-reflecting material is selected from the group consisting of: montmorillonite, dolomite, calcium carbonate, talcum, mica, volastonite, and clay.

5. The packaging material of claim wherein an outer plastic layer includes a white pigment or colouring agent concealing the intermediate layer.

6. A package for light-sensitive food products consisting of three plastic layers,
    two outer layers and an intermediate layer;
    wherein the outer layers are made of the same plastic, and at least one of the outer layers comprises about 5 weight % or less white pigment;
    the intermediate layer is made of the same plastic as the outer layers, and comprises about 0.04 to about 1.0 weight % light-absorbing material, and about 3 to about 80 weight % light-reflecting material; and
    wherein the package has a white appearance and prevents the transmission of ultra-violet light.

7. The package of claim 6 wherein the light-absorbing material is carbon black; and the light-reflecting material is selected from the group consisting of: montmorillonite, dolomite, calcium carbonate, talcum, mica, volastonite, and clay.

8. The package of claim 6, wherein the intermediate layer comprises about 65% by weight of the light-reflecting material.

9. The package of claim 6, wherein the white pigment is titanium dioxide.

10. The package of claim 6, wherein the intermediate layer further comprises a white pigment.

11. A packaging material consisting of a plurality of plastic layers, wherein:
    a. a layer comprises about 0.04 to about 1 weight % carbon black, and about 3 to about 80 weight % light-reflecting mineral particles; and
    b. all of the plastic layers are made of the same plastic; and
wherein the packaging material prevents the transmission of ultra-violet light.

12. The packaging material of claim 11, wherein the plastic is a polyolefin.

13. The packaging material of claim 11, wherein the plastic is a high density polyethylene or a copolymer of ethylene and propylene with a melt index between 0.5 and 5 according to American Society for Testing and Materials (2.16 kg; 230° C.).

14. The packaging material of claim 11, wherein the light-reflecting material is selected from the group consisting of: montmorillonite, dolomite, calcium carbonate, talcum, mica, volastonite, and clay.

15. The packaging material of claim 11, wherein a plastic layer includes a white pigment or colouring agent to impart a white appearance to the material.

* * * * *